Figure 1:
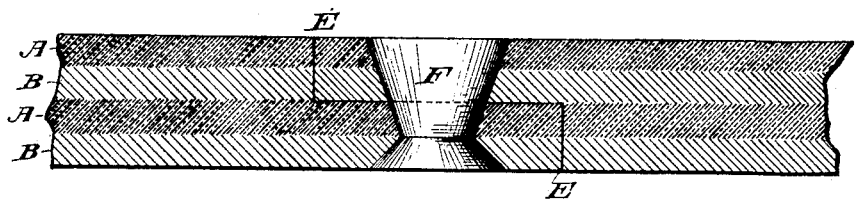

(No Model.) 2 Sheets—Sheet 1.

G. L. DAMON.
BURGLAR PROOF SAFE.

No. 252,435. Patented Jan. 17, 1882.

Attest:
Geo. T. Smallwood Jr.
L. M. Hopkins.

Inventor:
George L. Damon.
By Knight Bros
Attys.

N. PETERS, Photo-Lithographer, Washington, D. C.

(No Model.) 2 Sheets—Sheet 2.

G. L. DAMON.
BURGLAR PROOF SAFE.

No. 252,435. Patented Jan. 17, 1882.

UNITED STATES PATENT OFFICE.

GEORGE L. DAMON, OF BOSTON, MASSACHUSETTS.

BURGLAR-PROOF SAFE.

SPECIFICATION forming part of Letters Patent No. 252,435, dated January 17, 1882.

Application filed October 17, 1881. (No model.)

*To all whom it may concern:*

Be it known that I, GEORGE L. DAMON, a citizen of the United States, residing at Boston, in the county of Suffolk and State of Massachusetts, have invented a new and useful Improvement in Burglar-Proof Safes, Vaults, and Doors, Prisons, and like Structures, of which the following is a specification.

The preferred material employed of late years in the construction of burglar-proof safes, vaults, doors, and the like consists of bars and sheets of laminated metal, made of layers of steel and iron rolled together, and having a total thickness varying from one-eighth to one-fourth of an inch, according to requirement. The advantage of this material is that the layers of steel will harden perfectly drill-proof, and the iron, to which the steel is welded, prevents the steel from being fractured and removed in pieces, as would be practicable if solid steel simply were used.

The bars and plates of welded steel and iron have been built into the class of work named between layers of plate-iron alternated thus: first, a layer of plate-iron; second, a layer of welded steel and iron combined; third, another layer of plate-iron, and then another layer of the combined metal, and so on until a thickness of four or five inches of solid metal is built up, which at this time is deemed necessary for absolute protection against burglars. In the above construction the several layers have been secured together by rivets, screws, conical bolts, and nuts on the inside, and other like means, always commencing at the outside and leaving off on the inside.

In the construction of the above work the layers of combined welded steel and iron have usually been composed of bars, about six to eight inches wide, laid edge to edge, and in some instances the edges of the bars have had rabbets or tongues and grooves, either planed out or formed in the operation of rolling, and not exceeding three-fourths of an inch in width.

The present mode of using bars or plates of welded steel or iron simply laid together at the edges, as above described, presents a decidedly weak point in construction, as a burglar, by cutting out a piece of iron equal in width to one of the bars, can, by making one cut across the bar, bend it and finally break off the bar, and so go on until an entrance is effected.

It must be borne in mind that safes and vaults of large dimensions are now demanded, and up to this time it has been found impracticable to produce plates of welded steel and iron such as are required in the manufacture of such safes, and of the thickness named, exceeding thirty inches in width and in short lengths. Furthermore, great difficulty is experienced in hardening plates of this width, in consequence of the unequal expansion and contraction of the two metals in heating and cooling, causing the metal to warp badly out of its desired flat shape. Experience further shows that with plates of great width the required drill-proof hardness cannot be successfully attained, for the reason that with bodies of metal of large area the extended surface at the high heat necessary to admit of proper hardening forms a film of steam between the metal and the cold water into which it is plunged in hardening, thus preventing a sufficiently instantaneous chilling effect from the water to produce a drill-proof hardening of the steel, without which the whole work is a failure; but with narrow bodies of metal the steam escapes as fast as formed, thus permitting the water to act on the surface instantaneously and with the required effect. For these reasons narrow widths of metal are used.

It is apparent that if a safe could be manufactured with the whole thickness of the walls in one or even two layers of welded steel and iron, solidly rolled together, instead of building up the walls of numerous layers, a great improvement would be attained, and equal or superior protection provided at a less cost of manufacture, the present system of fastening the several layers together being dispensed with to a great extent and an important element of weakness in the structure eliminated.

In order to secure the result above specified, so far as may be possible, by securing practically continuous layers of welded steel and iron, my invention consists in the employment of bars or plates connected at their edges by grooves or laps of sufficient width to admit of fastening them together firmly by conical bolts, rivets, or other suitable appliances passing through the lapped or grooved joints, as hereinafter described, so as to fasten the plates or sections firmly and securely together.

In order that my invention may be fully understood, I will proceed to describe several modes of carrying it into effect, reference being had to the accompanying drawings, in which—

Figure 2:
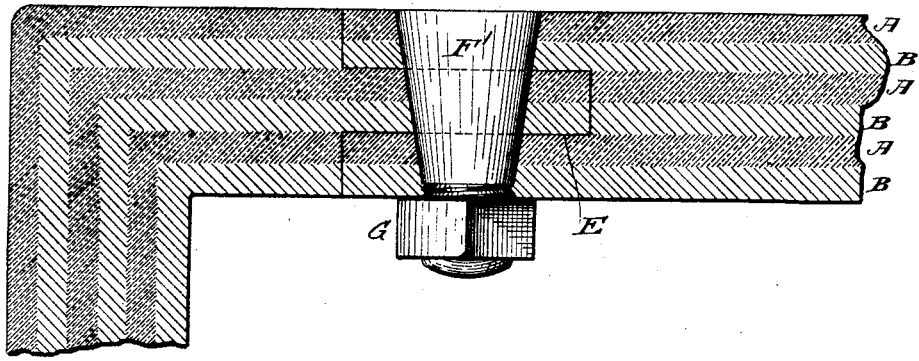
Figure 3:
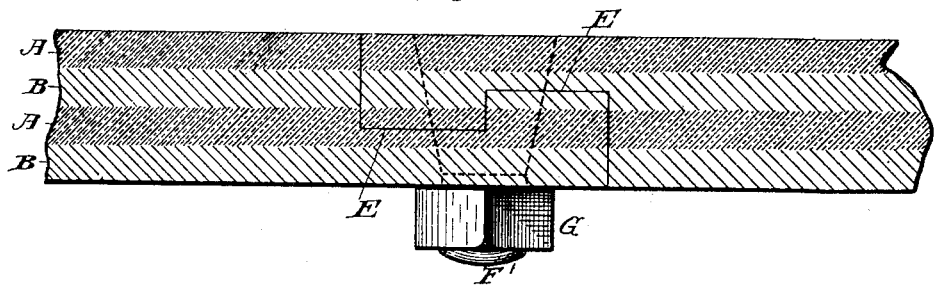
Figure 4:
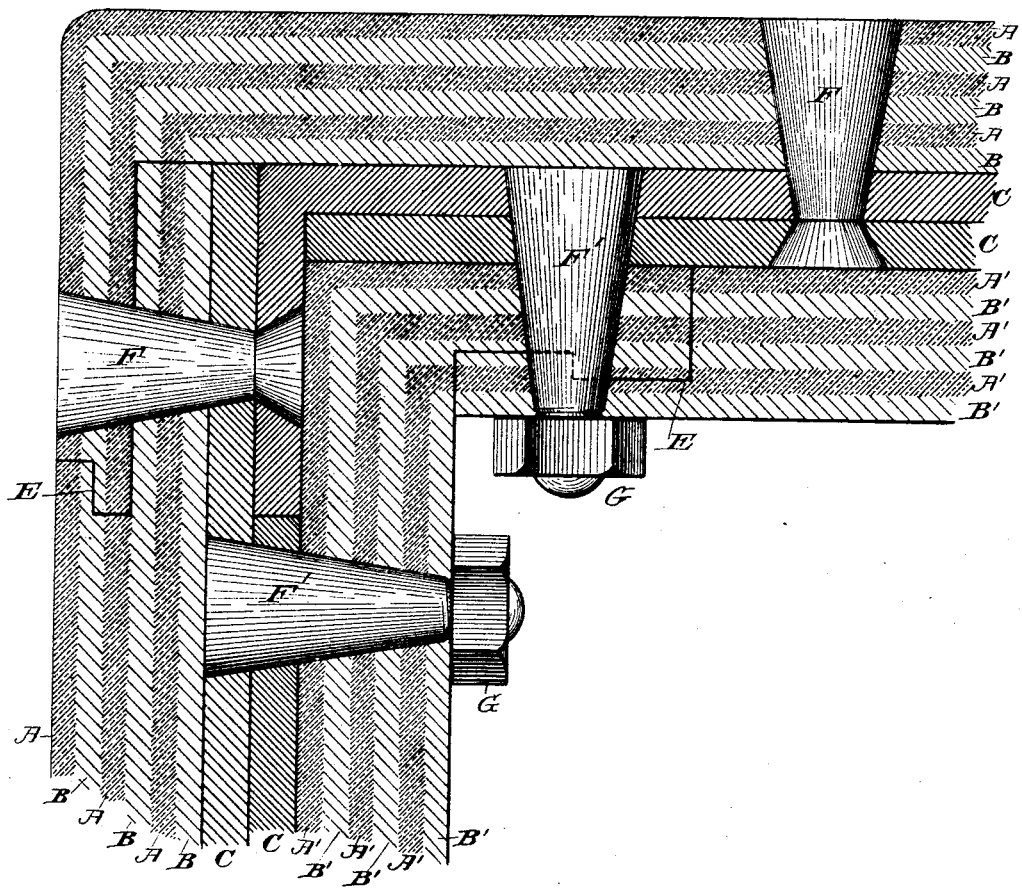

Figure 1 is a sectional view of two laminated plates connected by a single rabbet or scarfed joint with a rivet passing through said joint. Fig. 2 is a similar section of three laminated plates connected by a tongue-and-groove joint with a conical screw-bolt passing through said joint. Fig. 3 is a section of two laminated plates connected by an undercut scarf or double rabbet, through which a conical screw-bolt is passed as before. Fig. 4 illustrates a mode of applying the invention in the formation of a corner of a burglar-proof safe, with a scarf and rivet-and-bolt connections on the same principle.

A and B represent respectively iron and steel portions of laminated plates, which are produced by rolling in the customary manner, already referred to.

C C in Fig. 4 may represent plates of rolled wrought-iron, interposed between the successive layers or courses of laminated steel and iron plates A B A' B'.

Scarfed, rabbeted, or tongued-and-grooved joints, in various forms, are shown at E E E.

F represents conical rivets passing through the scarfed or tongued joints, said rivets being made flush with the respective surfaces of the plates, as required on the outer surfaces of the safe and on inside surfaces, against which additional layers or courses of metal are to be applied.

F' are conical bolts, flush on the outside and receiving nuts G on their inner ends.

These illustrations will serve to enable the skilled manufacturer to apply my invention in all classes of work and under varied requirements and circumstances. I do not confine myself to any dimensions or thickness of metal, but recommend metal in bars six to ten inches wide and from one to three inches in thickness, such sizes being now merchantable and admitting of proper hardening. If bent in hardening, I straighten the material by passing between rolls. Neither do I confine myself to any particular method or style of rivet, bolt, or other fastening passing through the joints. Rivets, bolts, or whatever form of fastenings employed for the purpose have the exposed ends hardened drill-proof, in order that the work may be as impenetrable at that point as at any other.

I do not claim novelty in the simple scarfed joints shown in Fig. 1, irrespective of a rivet or bolt passing through such scarfed joint, as I am aware that a simple scarf or rabbet of this form, but of less width, is commonly employed at the meeting edges of plates used in the construction of safes and like work.

By my mode of combining rivets or bolts with the scarfed or tongued joints I provide, in effect, a continuous layer or shell of combined hard and tough metal. My improved tongued-and-grooved joints (represented in Figs. 2 and 3) may be produced by either rolling or planing, and may be united by either conical rivets or bolts. Under my invention, wherever there is welded steel and iron throughout the construction of a safe, vault, prison-door, or like structure, which it is important to render proof against drilling and breaking, all the edges are formed and fastened on the principle I have described, by the combination or union of conical rivets or bolts, or equivalent fastenings, with suitable scarfed or tongued joints, and all angles and corners are strengthened on the same principle, with such modifications as may be necessitated or rendered desirable by the nature of the structure.

It will be apparent that with my improvement I can successfully make a whole safe, vault, or door, using only laminated plates of welded steel and iron, the wrought-iron plates illustrated in Fig. 4 being wholly dispensed with. Such plates have heretofore been used as a re-enforce to compensate, in part, for the weakness caused by the joining of the laminated plates, according to the present system, by simple rabbets.

By my improved construction I can produce work wholly of welded steel and iron in bars, grooved and fastened as shown and described, one and one-half inch thick, which will be equally as strong and secure against burglars as work now made of twice the thickness, thus effecting a great saving in cost of manufacture.

I am aware that it is not new to construct the walls of burglar-proof safes with alternate plates of iron and steel, and I am also aware that conical bolts have been used with alternated iron and steel plates.

I am also aware that the walls of burglar-proof safes constructed of alternate iron and steel plates have been connected at the corners by scarfed joints. It has been found by repeated experience that the joints, even when scarfed as heretofore, constitute a serious element of weakness, owing to the possibility of cutting and breaking some of the plates and bending the others up from the joints.

My improvement, which consists in a novel combination of conical bolts with scarfed joints, as hereinbefore described, adds materially to the security of the structure by rendering it as impenetrable at the joints as at other parts.

Having thus described my invention, the following is what I claim as new therein and desire to secure by Letters Patent:

1. As an improvement in burglar-proof safes, vaults, doors, and like work, the combination of rabbet or tongue-and-groove joints, with conical bolts or rivets passed through both members of said joints for fastening the same, substantially as described.

2. In burglar-proof safes, vaults, or like work, the combination of plates put together with an undercut scarf or double rabbet and conical bolts or rivets passing through both members of the respective joints, substantially as described.

GEORGE L. DAMON.

Witnesses:
URIAH A. POLLARD,
ARTHUR B. CURTIS.